UNITED STATES PATENT OFFICE 2,293,954

RECOVERY OF NICOTINE

Howard L. Tiger, New York, and John G. Dean, Binghamton, N. Y., assignors to The Permutit Company, New York, N. Y., a corporation of Delaware No Drawing. Application June 21, 1938, Serial No. 215,064

5 Claims. (Cl. 260—291)

This invention relates to recovery of nicotine; and it comprises a method of recovering nicotine in concentrated form from impure aqueous nicotine solutions, such as those obtained by extracting tobacco or tobacco stems and waste with water, or weak acid, said method including the steps of passing such a solution in contact with extensive surfaces of an ion-exchanging zeolite, so that the nicotine base is selectively taken up by the zeolite, and stripping the zeolite of nicotine with an acid or a salt to recover the nicotine and revivify the zeolite; the zeolite usually being stripped with a volatile acid and acid being recovered for reuse; all as more fully hereinafter set forth and as claimed.

Nicotine is an alkaloid of high toxicity, and by virtue of its insecticidal powers finds extensive use as a basis for agricultural sprays and poisons generally. Nicotine has marked basic properties, is liquid, is soluble in water in all proportions, and is volatile, being capable of distillation without decomposition at moderate temperatures. The base itself, as well as its salts, such as the hydrochloride and sulfate, are marketed as preparations of varying degrees of purity. Nicotine occurs in tobacco in amounts up to a few per cent, and the most common raw source material is tobacco itself or waste stems, stalks and other refuse left over from cigar and smoking tobacco manufactures. The conventional method of winning nicotine from such materials is to mix the moistened material with lime to liberate the alkaloid, and subject the mixture to heat, to volatilize and drive off the nicotine. The nicotine-laden vapors are passed through a series of sulfuric acid scrubbing towers, and the resulting nicotine sulfate solutions are concentrated to recover the salt in more or less pure and concentrated form. The residues are useful as fillers in fertilizers and have some fertilizing value because of their potash content. The process is costly.

According to the present invention there is provided an improved method for recovering nicotine from tobacco waste and the like, which is simple and economical and presents many advantages in practice. The process is based on the discovery that nicotine may be taken up more or less selectively from impure aqueous solutions thereof by certain zeolitic preparations, and may be recovered from the zeolites in high yield by a methodical treatment thereof. The success of the process depends in part on the recent development of insoluble carbonaceous substances of zeolitic character, produced by the action of suitable reagents on coal, lignite, etc., and capable of exchanging ions with aqueous saline solutions and of being repeatedly revivified or regenerated with mineral acids. Such substances can be made, for example by the action of sulfuric acid on lignite, coal, etc., under conditions producing sulfation of the carbonaceous material (British Patent 450,574); and by treating carbonizable materials with a powerful dehydrating agent, such as zinc chloride (French Patent 784,348). For details of the preparation of these exchangers, these patents may be consulted.

Our process involves as the first step, extracting tobacco wastes with water, advantageously warm or hot. By proper operation, almost all the nicotine can be recovered from the waste by simple leaching; the nicotine occurring in the leach liquor mostly as salts of organic acids. This dilute water extract, which contains in addition to nicotine, many soluble impurities derived from the tobacco, is then passed with or without a filtering step in contact with extensive surfaces of a zeolite of the type described (preferably arranged in two separate beds in series), which at the beginning of the process has been put in acid condition, for exchange of hydrogen for nicotine. Under such controlled conditions, the zeolite removes almost all the nicotine from the solution, and the removal is fairly selective or preferential. That is, while the original aqueous extract contains large proportions of impurities, the proportion of impurities going into the zeolite with the nicotine is much smaller. The next step is to strip the nicotine from the zeolites. This is done by treating the zeolites with acid to bring about a reverse exchange; hydrogen going into the zeolites and driving out the nicotine in the form of a salt of the acid used. To secure economical recovery, an excess of acid beyond theoretical quantity is required. By using a volatile acid, such as HCl, some of the excess acid in the effluent can be readily driven off by evaporation and recovered for a fresh regenerating step. The resulting product is a substantially acid-free saline nicotine concentrate which can be further purified if desired to any required degree of purity.

The process is quite efficient and the cost is low. The zeolite bed and most of the acid are used over and over, the heat requirements are low and the apparatus is simple. Evaporation of water, which is costly, is minimized, as the concentration of nicotine in the regeneration effluent from the zeolites, is very much higher than the concentration in the original aqueous tobacco extract.

The invention will be described in reference to a specific example, in which a certain tobacco, containing 4 per cent by weight of nicotine (air-dry basis) served as the raw material. The comminuted tobacco was successively agitated with three equal portions of water at 60° C., in such amounts as to give a combined total volume in the proportions of 33 liters extract liquor per kilogram of air-dry tobacco. More than 95 per cent of the nicotine was removed from the tobacco by the leaching. The liquor at 60° C. was passed successively in contact with two 40 liter beds of a carbonaceous zeolite in the acid condition, at a flow rate of 10 liters per minute, passage being continued so long as the effluent liquor from the second bed remained substantially nicotine-free; i. e. not containing more than 15 parts nicotine per million. The effluent, which contained less than 1 per cent of the nicotine, was sent to waste. About 2900 liters of liquor were passed through the two beds before more than a trace of nicotine began to appear in the effluent from the second bed. Using but a single such bed, about 1400 liters liquor can be passed through it before appreciable nicotine occurs in the effluent. After passage of the 2900 liters, the operation was stopped. The first bed of nicotine-charged zeolite, which contained about 2 kilograms nicotine, was then regenerated for recovery of the nicotine and revivification of the zeolite. The overrunning of the first bed in the two-bed series results in increasing the nicotine recovery by about 20 per cent over that possible in a single bed without considerable loss of nicotine in the effluent; two beds in series yielding a nicotine-free effluent of 1700 liters per bed. In regenerating, the charged bed was left for an hour in contact with 92 liters of normal HCl, at a temperature of 60–90° C. This quantity of acid was about 5 times the theoretical amount for regeneration of the zeolite.

The bed was then rinsed with 184 liters of warm water, giving a total combined effluent of 276 liters, which contained about 70 equivalents of acid and 6 equivalents, or about 1 kilogram, of nicotine. Thus about half of the nicotine of the zeolite was recovered by the acid treatment. This amount of rinse water removed about 98 per cent of the solubles from the zeolite. The revivified bed was then made second in series, the other bed being made first in series, and the system was ready for a new nicotine-removal operation.

The nicotine concentration in the effluent was more than 5 times that in the original tobacco leachings.

The effluent was now treated for recovery of nicotine and acid, by subjecting it to distillation, in a suitable apparatus, at a temperature range of 100° to 140° C. The first 80 per cent of the distillate contained only 1 or 2 per cent of the HCl; most of the HCl coming over in the last 20 per cent of the distillate. About one-fifth of the hydrogen of the HCl remained in the zeolite; taking the place, by interchange, of the nicotine. The last 20 per cent of the distillate was saved for regeneration in a subsequent cycle. Some 69 liters of normal HCl were thereby recovered, out of the original 92 liters used. Practically none of the nicotine is volatilized and lost during the distillation.

The distillation residue was a dark brown, sirupy material, containing 15 to 20 per cent nicotine, mostly in the form of the water-soluble hydrochloride, in admixture with about an equal weight of pyridine bases and other matters derived from the tobacco waste. The remainder was water and HCl. The residue can be dissolved in water for use as an agricultural spray. If desired, the solution can be subjected to further purification, in known ways, as by volatilization, for example, to obtain the pure crystalline salt.

In repeating the process in a cyclic manner, the second zeolite bed is now put first in series, as described, to receive the leach liquor from the tobacco waste, while the fresh, regenerated bed is put second in series. Upon appearance of substantial quantities (e. g., more than 15 parts per million) of nicotine in the effluent from the second bed, the first bed is regenerated as before, using the recovered HCl in admixture with additional HCl as required.

If desired, only a single zeolite bed need be used, in which case the yields per cycle are somewhat lower than with two beds operated in series as described above.

It is of advantage to carry out the leaching and zeolite extraction steps at an elevated temperature, as in the example given. In the zeolite extraction step, the volume of liquor which can be passed through the bed before appearance of nicotine in the effluent is about twice as great at 60° C. as at 20° C. Temperatures higher than 60° C. can be used.

While use of normal (i. e., 1 N) HCl gives good results as described, it is sometimes advantageous to use a more concentrated acid. For example, in the process outlined above, by regenerating the nicotine-charged zeolite bed with the same amount (92 liters) of 6 N HCl, 80 to 90 per cent of the nicotine was removed from the bed. Six-normal HCl is approximately the strength of the constant-boiling mixture of HCl and $H_2O$ vapors which is approached in distillation of HCl solutions whatever the initial acid strength. Thus the acid recovered from the zeolite effluent by distillation can be used directly in further regenerations if desired. However, it is usually more economical to use somewhat weaker acids in regeneration; say, those in the range 1 to 5 normal; in which case the distillate is diluted before recirculation.

Other acids can be used in lieu of HCl, e. g., sulfuric acid. The efficiency of the zeolite regeneration using sulfuric acid is only slightly less than with HCl. But ordinarily we use HCl because of the ease with which excess acid can be removed from the zeolite effluent.

Almost any type of acid-resistant zeolitic material is suitable for use in the process; though the requirement of acid resistance rules out most of the inorganic zeolites. As stated, certain recently developed carbonaceous zeolites, capable of ion exchange, with acid regeneration, and made by suitable treatments of coal, lignite, etc., with acids are well adapted for our purpose. The nicotine loaded zeolitic material may also be regenerated with a saline solution such as an aqueous solution of sodium chloride instead of using acid although volatile acids are preferred because any excess of the acid can be so readily recovered from the regeneration effluent.

The various apparatus elements are made of materials suitable for containing the reagents described.

What we claim is:

1. A method of recovering nicotine from impure aqueous solutions thereof derived from tobacco products comprising passing such a solution in contact with extensive surfaces of a synthetic high capacity carbonaceous ion-exchange material capable of repeated regeneration with acid to transfer the nicotine from the solution to said material, and treating the nicotine containing exchange material with an acid to displace the nicotine therefrom in the form of a salt of said acid and to regenerate said exchange material.

2. A method of recovering nicotine from aqueous tobacco extracts comprising passing such an extract in contact with extensive surfaces of a synthetic high capacity carbonaceous cation exchange material capable of repeated regeneration with acid to transfer the nicotine from the solution to said material, treating the nicotine containing exchange material with several times the quantity theoretically required of a volatile acid to regenerate the material and remove nicotine in the form of a salt of said acid, and separating the excess acid from the nicotine salt in the acid solution thus obtained by distillation thereof.

3. A method of recovering nicotine in concentrated form from impure aqueous solutions thereof derived from tobacco products comprising percolating such a solution through a bed of a granular, acid resistant, synthetic high capacity carbonaceous ion-exchange material to remove the nicotine from said solution, treating the nicotine containing exchange material at an elevated temperature with an excess of a volatile acid to liberate the nicotine in an acid solution and to regenerate the exchange material, and distilling the solution thus obtained to recover excess acid therein for subsequent regeneration.

4. A method of recovering nicotine from impure solutions thereof derived from tobacco products, comprising passing such a solution in contact with extensive surfaces of a solid synthetic high capacity carbonaceous cation exchange material to transfer nicotine from the solution to said material, and regenerating the nicotine containing exchange material with a sufficiently concentrated solution of hydrochloric acid to produce a relatively concentrated nicotine solution and restore such exchange material to a suitable condition for further treatment of said impure solutions.

5. A method of recovering nicotine from an aqueous extract of tobacco comprising passing such an extract in contact with a finely divided high capacity organic cation exchange material, thereafter regenerating the nicotine containing exchange material with at least about five times the quantity theoretically required of a volatile acid, and separating the nicotine from the excess acid by distillation of the regeneration effluent.

HOWARD L. TIGER.
JOHN G. DEAN.